Oct. 6, 1959  R. A. LOFMAN  2,907,842
BAROMETRIC ALARM
Filed July 21, 1958  3 Sheets-Sheet 1
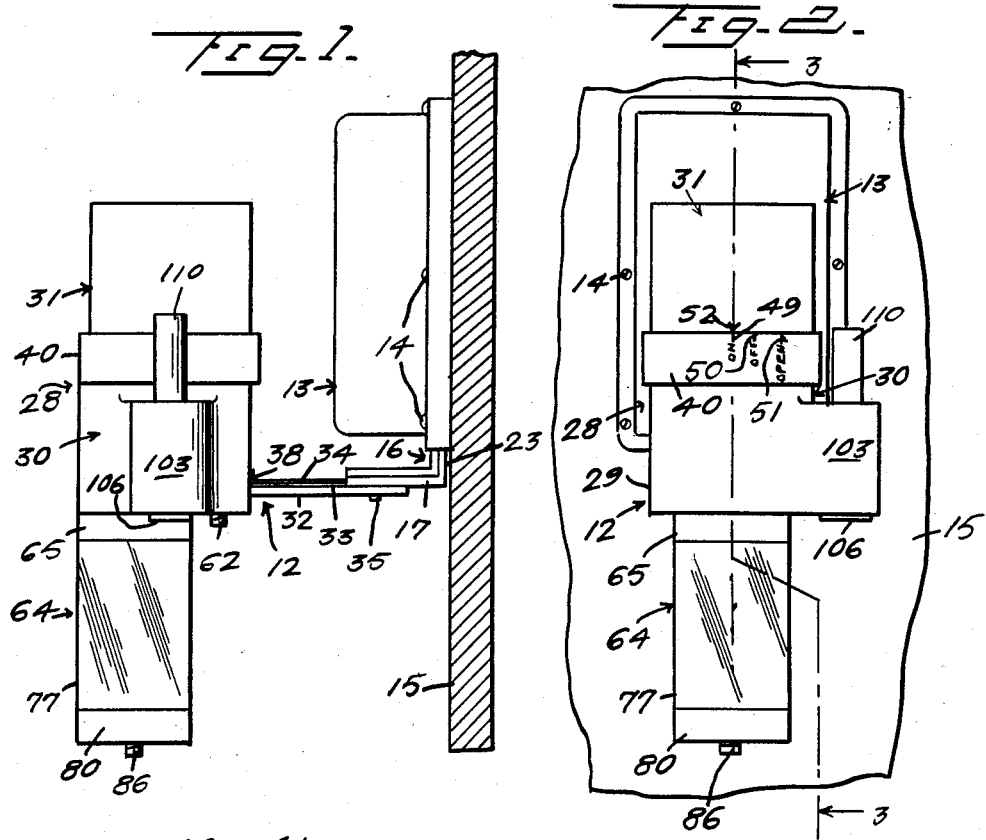
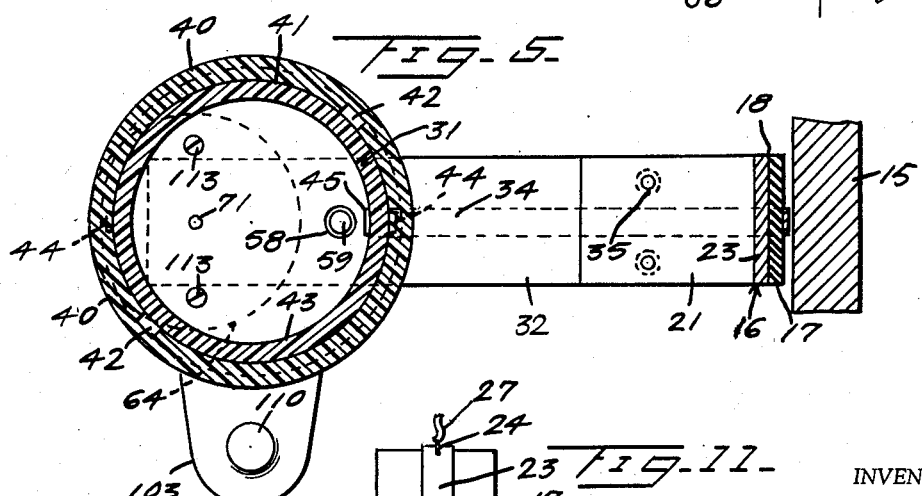
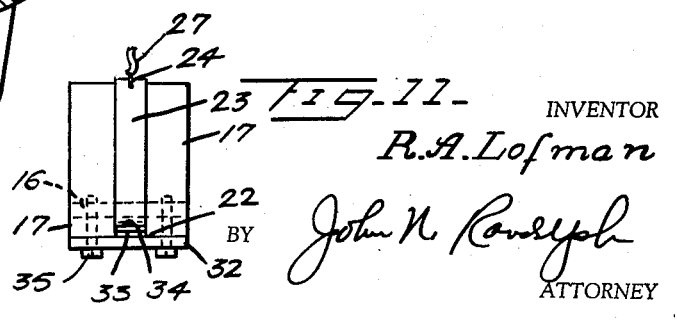
INVENTOR
R. A. Lofman
BY John N. Randolph
ATTORNEY Oct. 6, 1959  R. A. LOFMAN  2,907,842
BAROMETRIC ALARM
Filed July 21, 1958  3 Sheets-Sheet 2
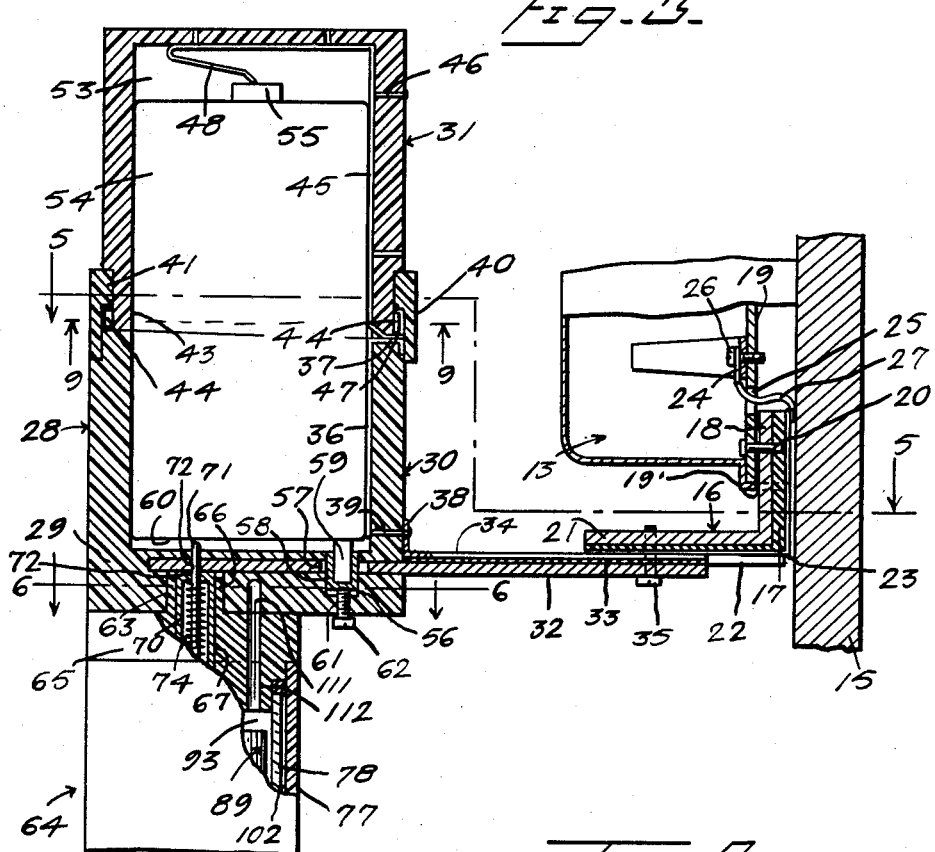
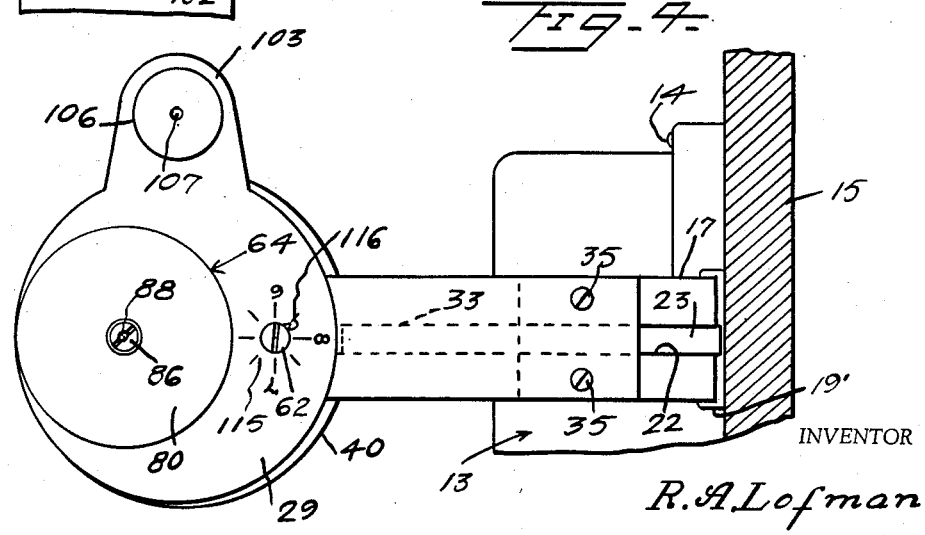
INVENTOR
R. A. Lofman
BY John N. Randolph
ATTORNEY Oct. 6, 1959  R. A. LOFMAN  2,907,842
BAROMETRIC ALARM
Filed July 21, 1958  3 Sheets-Sheet 3
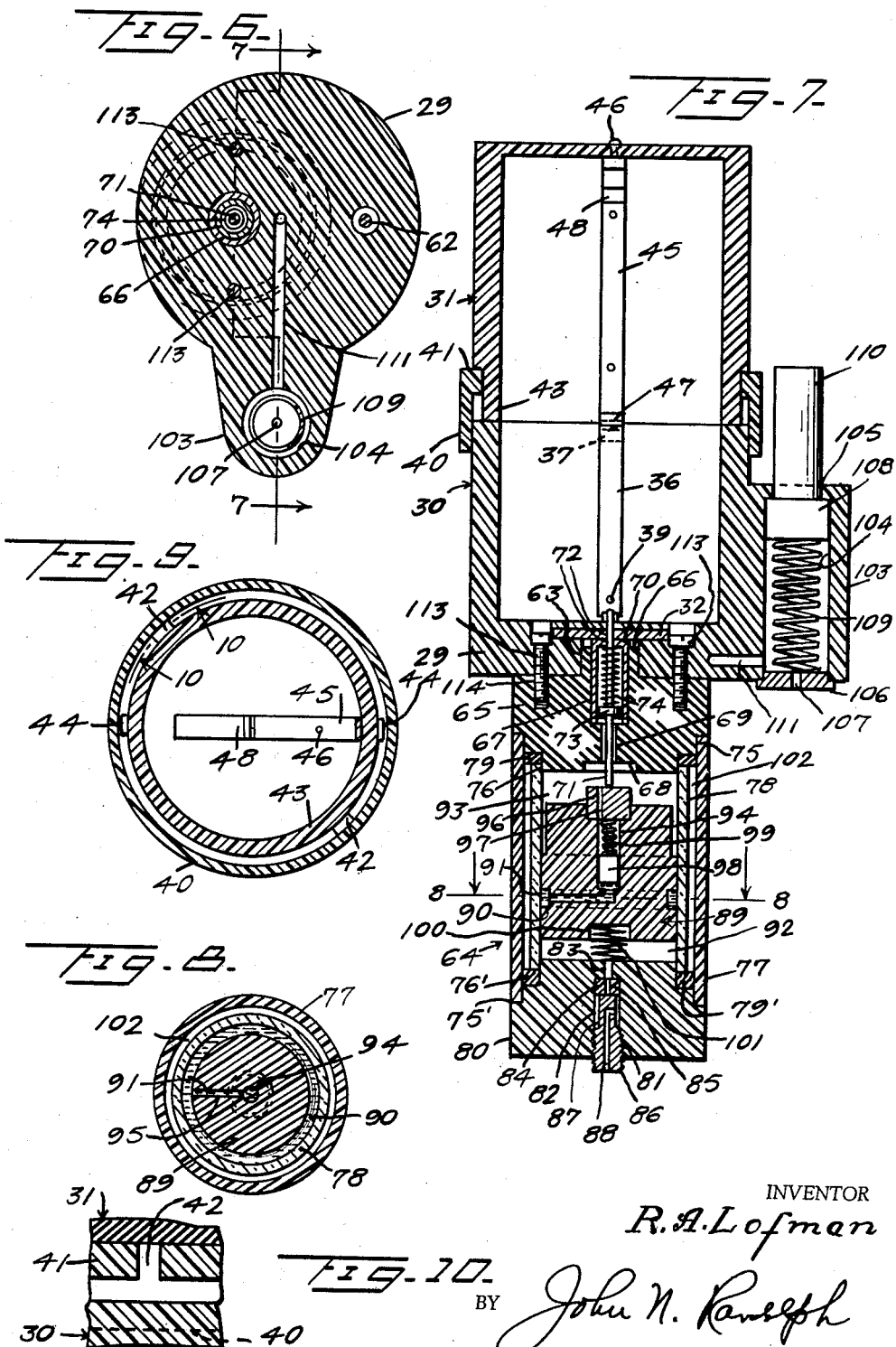
INVENTOR
R. A. Lofman
BY John N. Randolph
ATTORNEY

United States Patent Office 2,907,842
Patented Oct. 6, 1959

2,907,842

BAROMETRIC ALARM

Robert A. Lofman, Madison, Ohio

Application July 21, 1958, Serial No. 749,820

9 Claims. (Cl. 200—82)

This invention relates to a novel warning device or alarm for indicating the approach of a violent storm, such as a tornado, capable of causing a substantial drop in the barometric pressure.

Tornadoes, for example, usually occur in a very small area and, for this reason, residents of such area are ordinarily not forewarned by normal weather forecasts. Accordingly, it is an object of the present invention to provide a warning device of extremely simple construction which will provide the occupants of a home, for example, with adequate warning of the approach of a tornado or similar violent storm, so that proper and necessary safety precautions can be taken.

A further object of the invention is to provide an apparatus containing its own source of power so that operation of the warning device will not be affected by a power failure.

Still another object of the invention is to provide an apparatus of extremely simple construction which may be very economically manufactured and sold and will thus be readily available to home owners, yet which will be extremely efficient in accomplishing its intended result.

Still a further object of the invention is to provide an apparatus having novel means for checking the accurate operativeness thereof so that a home owner will be at all times assured that the device is ready to function when required.

Other objects and advantages of the invention will hereinafter become more fully apparent from the following description of the drawings, illustrating a presently preferred embodiment thereof, and wherein:

Figure 1 is a side elevational view showing the fully assembled barometric alarm in an applied position on a wall or other upright support;

Figure 2 is a front elevational view thereof looking from left to right of Figure 1;

Figure 3 is an enlarged fragmentary vertical sectional view, partially in elevation, taken substantially along a plane as indicated by the line 3—3 of Figure 2;

Figure 4 is a fragmentary bottom plan view of the alarm, on an enlarged scale relative to Figures 1 and 2;

Figure 5 is a horizontal sectional view taken substantially along the line 5—5 of Figure 3;

Figure 6 is a horizontal sectional view, taken substantially along a plane as indicated by the line 6—6 of Figure 3;

Figure 7 is a vertical sectional view taken substantially along a plane as indicated by the line 7—7 of Figure 6;

Figure 8 is a horizontal sectional view taken substantially along a plane as indicated by the line 8—8 of Figure 7;

Figure 9 is a horizontal sectional view taken substantially along a plane as indicated by the line 9—9 of Figure 3, and with the battery omitted;

Figure 10 is a fragmentary vertical sectional view taken substantially along the line 10—10 of Figure 9, and Figure 11 is a fragmentary end elevational view of a part of the apparatus.

Referring more specifically to the drawings, the barometric alarm in its entirety is designated generally 12 and is adapted to be employed with and supported by a conventional audible type electric signal such as an electric buzzer 13 of a type requiring very low voltage to operate the buzzer and so that it can be operated by current supplied from a conventional dry cell flashlight-type battery. The buzzer 13 is adapted to be mounted in a conventional manner as by screw fastenings 14 on an upright support 15, such as the inner side of a wall of a house or other enclosure.

The barometric alarm 12 includes a metal arm 16 of angular form having an electrical insulator member 17 disposed on the outer side thereof and extending from end-to-end of the arm 16. The arm 16 and insulator 17 include an upright portion 18 which extends upwardly through an opening 19' in the base flange of the buzzer 13, as best seen in Figure 3, and which parts are secured to the base plate 19 of the buzzer by transversely spaced fastenings 20. The other part 21 of the arm 16 and the insulator member 17, extends outwardly from beneath the buzzer 13. The underside of said bottom portion of the insulator 17, which is disposed beneath the arm portion 21, has a relatively deep groove 22 extending from end-to-end thereof, as seen in Figures 3, 4 and 11. One end of a strip of electrical conducting material 25 is disposed in and extends from end-to-end of the bed of the groove 22 and the other end of said strip 23 extends upwardly along the outer side of the upright portion of the insulator 17. Said last mentioned end of the strip 23 has an electrical conductor wire 24 extending therefrom into the buzzer 13 through an opening 25 of the plate 19, and which wire 24 is insulated from the plate 19 by a tubular sheath 27 of electrical insulating material. The terminal of the conductor wire 24 is connected to a post 26 forming one contact of the buzzer 13, to thus electrically connect said buzzer contact 26 to the conductor strip 23. The fastenings 20 are laterally spaced from the strip 23, so that said strip is insulated from said fastenings 20 and the buzzer plate 19 by portions of the insulator member 17.

The barometric alarm 12 includes a battery casing, designated generally 28, formed of a hard plastic or other electrical insulating material, preferably of cylindrical shape and having a relatively thick end wall 29 forming the bottom of the casing 28. Said casing 28 is divided substantially midway of its ends and thus comprises a lower section, designated generally 30, and an upper section, designated generally 31.

One end of a metal bar 32 is embedded in and anchored to the casing bottom 29 and extends substantially across said bottom 29. A strip of electrical insulating material 33 extends along the upper side of the medial portion of the other exposed end of the bar 32, and a strip of electrical conducting material 34 is disposed on and extends from end-to-end of the insulating strip 33 and is thereby electrically insulated from the bar 32. The free end of the bar 32 underlies the free end of the arm portion 21 and is rigidly secured thereto by screw fastenings 35, which additionally form an electrical connection between the arm 16 and the bar 32, and which fastenings straddle and are spaced from the strips 23, 33 and 34. Portions of the strips 33 and 34 engage in the groove 22 so that the conductor strip 34 is in electrical contact with the strip 23, and said strips 23 and 34 are electrically insulated from the arm 16 and bar 32 by the insulator members 17 and 33, as best illustrated in Figures 3 and 11. The arm 16 and bar 32 form a ground connection from the buzzer 13 through its metal base plate 19, as will hereinafter be more fully described, and said parts 16 and 32 additionally form a rigid bracket for mounting the battery casing 28 on the buzzer 13.

A strip of electrical conducting material 36 extends vertically along the inner side of the cylindrical wall of the lower casing section 30 and has an upper end 37 engaging over a part of the upper edge of the casing section 30. The lower end of the conductor strip 36 is electrically connected to an upturned end 38 of the strip 34 by a fastening 39 which extends through the cylindrical wall of the casing section 30.

A collar 40 of electrical insulating material is secured around the upper end of the lower casing section 30 and extends upwardly therefrom and has an internally thickened upper end portion 41 which is disposed above and spaced from the casing section 30. Said internally thickened portion 41 is provided with diametrically opposed internal grooves 42, as best seen in Figure 5. The upper casing section 31, which is in the shape of a cylindrical cap or inverted cup, has an externally restricted lower end 43 sized to fit slidably and turnably in the restricted collar portion 41 and which is of a length as great as the portion of the collar 40 which extends above the lower casing section 30. The annular portion 43 has diametrically opposed outwardly projecting stud portions 44 sized to move through the slots 42, when in vertical alignment therewith, and which can be turned out of alignment with the slots 42 to assume positions beneath the collar portion 41 for locking the casing section 31 on the casing section 30, as illustrated in Figure 3. A strip of electrical conducting material 45 is secured to the inner side of the section 31 by fastenings 46 and has one end 47 disposed against a part of the bottom edge of the section 31 and other free end 48 forming a spring contact which terminates near the center of the casing section 31, adjacent to but spaced from the top thereof. As best seen in Figure 2, the exterior of the front portion of the collar 40 has three circumferentially spaced graduations 49, 50 and 51, designated respectively "on," "off" and "open." The exterior of a part of the cylindrical wall of the upper section 31 has a downwardly directed pointer 52. When the pointer 52 is disposed in alignment with the graduation 51, the studs 44 are in alignment with the slots 42, so that the upper section 31 can be connected to or disconnected from the lower section 30. When the upper section 31 is turned to align the pointer 52 with the graduation 49, the casing sections are locked together and electrical contact portions 37 and 47 are in engagement with one another, as seen in Figure 3. When the pointer 52 is in alignment with the graduation 50, the casing sections are locked together but the contact 47 is out of engagement with the contact 37. The assembled casing sections 30 and 31 form a chamber 53 in which a flashlight-type dry cell battery 54 is detachably housed with the positive contact 55 thereof facing upwardly and engaged by the spring contact portion 48 of the strip 45.

The base or bottom 29 of the battery casing 28 has an upwardly opening socket 56 which extends through an opening 57 of the bar 32 and which is of substantially larger diameter than the socket 56, as seen in Figure 3. The socket 56 has a cup shaped metal support member 58 slidably mounted therein and disposed to open upwardly. A core 59 of metal fits in the cup member 58 and extends from the upper end thereof upwardly into the bottom portion of the chamber 53 and bears against a base or negative end 60 of the battery 54. The parts 58 and 59 are electrically insulated from the bar 32 by the portion of the base 29 forming the socket 56. A threaded bore 61 extends upwardly from the underside of the base 29 into the bottom of the socket 56 and a screw 62 is threaded upwardly through the bore 61 against the bottom of the cup member 58 for adjustably supporting the parts 58 and 59 and to combine therewith for adjustably supporting the battery 54 with its base 60 spaced from the bottom of the chamber 53 and the upper side of the casing base 29.

The socket 56 is disposed near the rear of the base 29 from which the bar 32 projects. Said base 29 is provided with a downwardly opening socket 63 the upper end of which is closed by a part of the bar 32, and which socket 63 is forwardly offset relative to the axis of the casing 28. A switch actuator housing, designated generally 64, of smaller diameter than the casing 28, includes an upper end wall 65 of electrical insulating material having a centrally disposed upwardly extending tubular boss 66 fitting into the socket 63. The end wall 65 has a bore 67 the upper portion of which extends through the boss 66 and the lower part of which extends downwardly a substantial distance below said boss. The underside of the end wall 65 has a centrally disposed downwardly opening recess or depression 68 and a restricted bore 69 is formed in the end wall 65 between the depression 68 and the lower end of the bore 67. A metal cylinder 70 fits snugly in the bore 67 and projects from the upper end of the boss 66 and bears against a part of the bar 32. A stem 71 extends loosely through the cylinder 70, bore 69, depression 68, and has a lower end projecting downwardly from the underside of the housing end wall 65. The upper end of the stem 71 extends slidably through aligned openings 72 in the upper end wall of the cylinder 67 and in the bar 32 and the portion of the base 29 disposed above said bar, and said upper portion of the stem 71 contacts the upper end of the cylinder 70 and the bar 32. The stem 71 has a collar 73 fixed thereto and slidably disposed in the lower portion of the cylinder 70. A light compression spring 74 fits loosely in the cylinder 70 and around a part of the stem 71 and has an upper end bearing against the upper end of said cylinder and a lower end bearing against the collar 73 for urging the stem downwardly.

The lower portion of the periphery of the end wall 65 has two annular stepped portions 75 and 76. The upper end of a transparent cylinder 77, which is preferably formed of plastic, fits around and against the upper step 75 and the upper end of an inner transparent cylinder 78 fits around the lower step 76. A seal 79, preferably of modeling clay, is disposed between the upper portion of the step 76 and the upper end of the inner transparent cylinder 78 and also contacts a portion of the inner surface of the outer cylinder 77 for forming an effective seal and gasket between said cylinders and the upper end wall 75. Said inner cylinder 78 is preferably formed of glass. The switch actuator housing 64 additionally includes a lower end wall 80 having an outer step 75' and an inner step 76', corresponding to the steps 75 and 76, respectively, for receiving the lower ends of the cylinders 77 and 78, respectively. A seal 79', corresponding to the seal 79, is mounted in the same manner as the seal 79, relative to the step 76' and the lower ends of the cylinders 78 and 77.

Said lower end wall 80 has a bore extending from top to bottom therethrough including a threaded lower end portion 81, an intermediate portion 82 of slightly smaller diameter than the bore portion 81 and an upper end portion 83 of restricted diameter relative to the bore portion 82. A sealing block 84 of rubber or similar material is mounted in the upper end of the bore portion 82 and has a small centrally disposed bore 85 extending therethrough and registering with the inner end of the bore portion 83. A plug has an enlarged threaded outer end 86 adjustably mounted in the bore portion 81 and a restricted inner end 87 which fits loosely in the bore portion 82, and the upper end of which is adapted to normally bear against the lower end of the sealing block 84 for sealing the passage 85 thereof. Said plug has a bore or passage 88 one end of which opens outwardly of the threaded plug end 86 and the other end of which opens laterally from the restricted plug end 87 into the intermediate bore portion 82.

A piston 89, preferably formed of plastic, is slidably mounted in the inner cylinder 78 between the end walls 65 and 80 and is provided, near its lower end, with an outwardly opening annular peripheral groove 90 containing mercury 91 which forms a sealing ring between a chamber 92, disposed beneath the piston 89, and a chamber 93, disposed above said piston. The upper portion of the piston is provided with a longitudinally extending bore 94 the lower end of which communicates with a radial bore 95. Bore 95 forms a connecting passage between the bore 94 and groove 90. A plug 96 is secured in an enlarged upper end of the bore 94 and has a bore 97 extending from top to bottom therethrough, forming a communicating passage between the bore 94 and the upper chamber 93, which is offset relative to the lower end of the stem 71 which bears against the central portion of the upper side of the plug 96. A piston 98 is slidably disposed in the bore 94 and bears upon the mercury 91 contained therein. A weak compression spring 99 is disposed in the bore 94 between the piston 98 and plug 96 for maintaining a sufficient pressure on the mercury 91 so that the groove 90 would at all times be maintained full of mercury. As seen in Figure 7, the piston 89 is restricted above the groove 90 for minimizing the frictional engagement of said piston with the wall of the cylinder 78. The lower end of the piston 89 has a downwardly opening socket 100 in which the upper end of a compression spring 101 seats. The lower end of the spring 101 bears upon the upper end of the end wall 80 for urging the piston 89 upwardly.

The transparent cylinders 77 and 78 are spaced from one another to form an air chamber 102 therebetween constituting a thermal seal to minimize temperature fluctuations within the cylinder 78.

The lower casing section 30 has a lateral extension or enlargement 103 forming a cylinder 104 which extends longitudinally of the casing 28 and which has a restricted open upper end 105. The open lower end of the cylinder 104 is normally closed by a removable plug 106 having a vent port 107. A piston or plunger 108 is reciprocably mounted in the cylinder 104 and a compression spring 109 is contained in said cylinder between the piston 108 and the plug 106, for normally holding the piston at the upper end of the cylinder. The piston or plunger 108 has an elongated stem 110 extending upwardly therefrom and reciprocably disposed in the opening 105. As seen in Figures 6 and 7, one end of a passage 111 opens into the lower portion of the cylinder 104. The passage 111 extends radially inward of the base 29, from the cylinder 104, and is disposed below the level of the bar 32 and has a downturned opposite end communicating with the upper end of a passage 112 which extends from top to bottom through the upper end wall 65 and which opens into the upper chamber 93.

Screws 113 are turnably mounted in and extend downwardly from the base 29 and threadedly engage in upwardly opening threaded sockets 114 of the end wall 65 for detachably securing the switch actuator housing 64 to the battery casing 28 and with the passage 112 in registration with the passage 111. The heads of the screws 113 are countersunk in the base 29, as seen in Figure 7.

With the barometric alarm 12 assembled as illustrated in the drawings, the plug 86 is adjusted downwardly away from the seal 84 so that air can be exhausted from the chamber 92. This is accomplished by sealing the vent port 107 with the thumb while pressing downwardly on the stem 110 for forcing air from the cylinder 104 through passages 111 and 112 to pressurize the upper chamber 93 and thereby force the piston 89 downwardly. While the piston 89 is held in this manner in a lowered position, the plug 86 is advanced upwardly to seal the port 85 and thereby the chamber 92. The vent port 107 is then exposed and the stem 110 is released to allow the piston 108 to be returned to its position of Figure 7 by the spring 109 and so that the upper chamber 93 will then be at atmospheric pressure. The spring 101 will force the piston 89 upwardly to a limited extent to create a partial vacuum in the lower chamber 92.

The underside of the base 29 contains barometric calibrations 115 around the screw 62, as seen in Figure 4. The head of the screw 62 has a pointer 116 for use with these graduations. The alarm 12 can be checked with a mercury barometer by turning the screw 62 counterclockwise to a higher reading on the scale 115 and which is equal to or higher than the reading on the barometer. When this has been accomplished the alarm should sound since by thus moving the screw 62 downwardly the parts 58 and 59 will also move downwardly permitting a downward movement of the battery 54 and which should result in the upper end of the stem 71 contacting the base end 60 to complete the electric circuit for energizing the buzzer 13. When this has been accomplished, the screw 62 is turned clockwise, usually about one-half a turn to provide a setting on the scale 115 equivalent to a barometric reading between 28.50 and 27.00, depending upon the elevation where the alarm 12 is being used. This clockwise and upward movement of the screw 62 will elevate the battery support parts 58 and 59 to displace the battery 54 upwardly so that its base is out of engagement with the stem 71.

A sudden drop in atmospheric pressure such as occurs when a tornado or other violent storm is eminent will effect a similar drop in pressure in the upper chamber 93, wherein the pressure always corresponds to atmospheric pressure, and as a result the spring 101 will lift the piston 89 sufficiently to move the stem 71 upwardly into engagement with the battery base 60 for thereby closing the circuit to sound the buzzer 13. Current from the battery 54 passes through conductor parts 45, 36, 39, 34, 23 and 24 to the buzzer contact 26 and from the buzzer base plate 19 through the parts 16, 35, 32 and 71 back to the negative terminal of the battery 54. Thus, the upper portion of the stem 71 forms the movable contact of the switch.

The part 59 is formed of a metal having heat expansible characteristics so that an abnormal increase of temperature will expand said part 59 to lift the battery 54 to compensate for expansion within the lower chamber 92 and which would have a tendency to lift the piston 89, so that temperature fluctuations will not be effective to complete the electric circuit of the alarm.

The cylinder 104 and its associated parts also provide a means whereby the operativeness of the alarm 12 can be readily checked at any time to determine that the alarm is ready to function properly. This is accomplished by manually displacing the piston 108 downwardly and while the vent port 107 is exposed so that air is expelled from the cylinder 104 through said port. The spring 109 is then permitted to move the piston 108 upwardly with the port 107 closed, for creating a partial vacuum in the upper chamber 93 so that the spring 101 can force the piston 89 upwardly to displace the upper end of the stem 71 into engagement with the battery base 60. By allowing the piston 108 to move slowly upward during this operation to determine the extent of piston movement required before the buzzer circuit is closed, the accuracy of the setting of the alarm 12 can be checked with reasonable accuracy by checking the reading of a mercury barometer, when the setting of the pointer 116 relative to the scale 115 is known.

Various modifications and changes are contemplated and may be resorted to, without departing from the function or scope of the invention as hereinafter defined by the appended claims.

I claim as my invention:

1. In a barometric alarm, a housing including a cylinder, first and second switch contacts supported by the housing beyond an end of the cylinder in electrically insulated spaced relation to one another, a piston reciprocably mounted in the cylinder for movement toward and away from said contacts, said cylinder having a first end chamber and a second end chamber, said end chambers being sealed off from one another by the piston, said first end chamber being disposed adjacent said contacts, means forming a passage communicating with said first end chamber and opening to the atmosphere whereby atmospheric pressure in the first end chamber will limit movement of the piston toward said contacts, a stem forming a movable switch contact reciprocably mounted in a part of the housing and slidably contacting the second switch contact and having one end engaging the piston and an opposite end normally spaced from the first switch contact, spring means engaging and urging the piston toward the first and second switch contacts whereby when atmospheric pressure falls to a predetermined point in the first chamber, the stem is moved by the piston into engagement with said first switch contact for forming an electrical bridge between the first and second switch contacts, and means for venting and sealing said second end chamber for creating a partial vacuum therein to resist displacement of the piston by said spring means.

2. In a barometric alarm as in claim 1, manually actuated means supported by the housing and communicating with said first end chamber through said passage forming means for pressurizing the first end chamber and forcing the piston into the second end chamber to partially evacuate said second end chamber when the vent means thereof is in an open position.

3. In a barometric alarm as in claim 2, and means forming a part of said manually actuated means and operable for selectively creating a partial vacuum in said first end chamber to effect a movement of the piston and stem toward a position for bridging the first and second switch contacts.

4. In a barometric alarm, a housing including a cylinder, first and second switch contacts supported by the housing beyond an end of the cylinder in electrically insulated spaced relation to one another, a piston reciprocably mounted in the cylinder for movement toward and away from said contacts, said cylinder having a first end chamber and a second end chamber, said end chambers being sealed off from one another by the piston, said first end chamber being disposed adjacent said contacts, means forming a passage communicating with said first end chamber and opening to the atmosphere whereby atmospheric pressure in the first end chamber will limit movement of the piston toward said contacts, a stem forming a movable switch contact reciprocably mounted in a part of the housing and slidably contacting the second switch contact and having one end engaging the piston and an opposite end normally spaced from the first switch contact, spring means engaging and urging the piston toward the first and second switch contacts whereby when atmospheric pressure falls to a predetermined point in the first chamber, the stem is moved by the piston into engagement with said first switch contact for forming an electrical bridge between the first and second switch contacts, said piston having an annular outwardly opening groove, mercury contained in said groove and engaging the cylinder wall for sealing off said chambers from one another, said piston having bores communicating with said groove and forming a mercury storage chamber, and piston means contained in a part of said storage chamber and supported by the mercury column for maintaining said groove filled with the mercury under pressure.

5. In a barometric alarm, a housing including a cylinder, first and second switch contacts supported by the housing beyond an end of the cylinder in electrically insulated spaced relation to one another, a piston reciprocably mounted in the cylinder for movement toward and away from said contacts, said cylinder having a first end chamber and a second end chamber, said end chambers being sealed off from one another by the piston, said first end chamber being disposed adjacent said contacts, means forming a passage communicating with said first end chamber and opening to the atmosphere whereby atmospheric pressure in the first end chamber will limit movement of the piston toward said contacts, a stem forming a movable switch contact reciprocably mounted in a part of the housing and slidably contacting the second switch contact and having one end engaging the piston and an opposite end normally spaced from the first switch contact, spring means engaging and urging the piston toward the first and second switch contacts whereby when atmospheric pressure falls to a predetermined point in the first chamber, the stem is moved by the piston into engagement with said first switch contact for forming an electrical bridge between the first and second switch contacts, and said housing including radially spaced cylindrical walls defining a sealed chamber therebetween surrounding said chambers and piston and providing a thermal seal.

6. In a barometric alarm, a housing including a cylinder, first and second switch contacts supported by the housing beyond an end of the cylinder in electrically insulated spaced relation to one another, a piston reciprocably mounted in the cylinder for movement toward and away from said contacts, said cylinder having a first end chamber and a second end chamber, said end chambers being sealed off from one another by the piston, said first end chamber being disposed adjacent said contacts, means forming a passage communicating with said first end chamber and opening to the atmosphere whereby atmospheric pressure in the first end chamber will limit movement of the piston toward said contacts, a stem forming a movable switch contact reciprocably mounted in a part of the housing and slidably contacting the second switch contact and having one end engaging the piston and an opposite end normally spaced from the first switch contact, spring means engaging and urging the piston toward the first and second switch contacts whereby when atmospheric pressure falls to a predetermined point in the first chamber, the stem is moved by the piston into engagement with said first switch contact for forming an electrical bridge between the first and second switch contacts, and manually adjustable means mounted in the housing and engaging the first switch contact for varying the spacing between the first and second switch contacts.

7. In a barometric alarm as in claim 6, and means associated with said adjustable means and with a part of said housing and providing a barometric scale.

8. In a barometric alarm as in claim 7, said manually adjustable means including an expansive temperature responsive part adapted to be expanded in response to an abnormal temperature increase for displacing the first switch contact away from the second switch contact to compensate for expansion of the air in said second end chamber and displacement of the piston resulting therefrom.

9. In a barometric alarm, a housing including a cylinder, first and second switch contacts supported by the housing beyond an end of the cylinder in electrically insulated spaced relation to one another, a piston reciprocably mounted in the cylinder for movement toward and away from said contacts, said cylinder having a first end chamber and a second end chamber, said end chambers being sealed off from one another by the piston, said first end chamber being disposed adjacent said contacts, means forming a passage communicating with said first end chamber and opening to the atmosphere whereby atmospheric pressure in the first end chamber will limit movement of the piston toward said contacts, a stem forming a movable switch contact reciprocably mounted in a part of the housing and slidably contacting the second switch contact and having one end engaging the piston and an opposite end normally spaced from the first switch contact, spring means engaging and urging the piston toward the first and second switch contacts whereby when atmospheric pressure falls to a predetermined point in the first chamber, the stem is moved by the piston into engagement with said first switch contact for forming an electrical bridge between the first and second switch contacts, and a second spring means engaging said stem and urging the stem away from said first switch contact and toward the piston.

References Cited in the file of this patent

UNITED STATES PATENTS

| | | |
|---|---|---|
| 1,664,065 | Dowdy et al. | Mar. 27, 1928 |
| 2,064,179 | Ragsdale | Dec. 15, 1936 |
| 2,388,542 | Hobbs | Nov. 6, 1945 |
| 2,501,660 | Bohle | Mar. 28, 1950 |
| 2,800,548 | Stary | July 23, 1957 |
| 2,814,687 | Forwald | Nov. 26, 1957 |